No. 820,520. PATENTED MAY 15, 1906.
A. RIEBE & P. BRÜHL.
BALL BEARING.
APPLICATION FILED JAN. 19, 1905.

Fig. 2. Fig. 3. Fig. 5.

Fig. 7. Fig. 4. Fig. 6.

WITNESSES:
Fred White
René Shine

INVENTORS:
August Riebe & Paul Brühl,
By their Attorneys:
Arthur E. Pras & Co.

UNITED STATES PATENT OFFICE.

AUGUST RIEBE AND PAUL BRÜHL, OF BERLIN, GERMANY.

BALL-BEARING.

No. 820,520. Specification of Letters Patent. Patented May 15, 1906.

Application filed January 19, 1905. Serial No. 241,770.

*To all whom it may concern:*

Be it known that we, AUGUST RIEBE, residing in Huttenstrasse 34/35, and PAUL BRÜHL, residing in Waldstrasse 47, Berlin, in the Kingdom of Prussia, Germany, subjects of the King of Prussia, German Emperor, have invented certain new and useful Improvements Relating to Ball-Bearings, of which the following is a full, clear, and exact description.

This invention relates to ball-bearings in which the balls are separated by intermediate pieces, which with the object of avoiding noise or for other reasons are mounted in such a manner as to oscillate or which are formed by springs, to the ends of which plates are attached. When ball-bearings are so used in connection with crank-pins or other parts of machinery, the motion of the balls is sometimes either accelerated or retarded, with the result that in either case, according to the direction of inertia, all the balls are forced together at one spot of the bearing. By thus accelerating the speed of the balls or by causing all the balls to congregate at one spot the intermediate pieces have to withstand an excessive pressure with the result that the springs, as well as the end plates, are subjected to excessive wear and tear and to the risk of being broken, whereby the accurate operation of the bearing is jeopardized to a greater or a lesser extent.

It is the object of this invention by the adoption of suitable means to prevent the occurrence of the defects referred to.

The invention is illustrated in the accompanying drawings.

Figure 1:
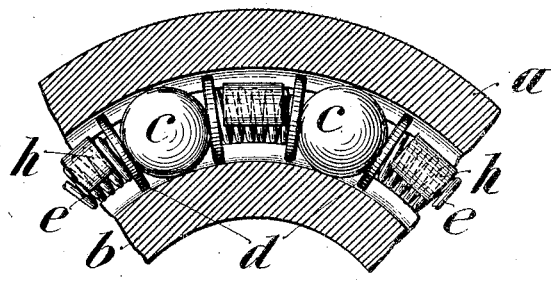
Figure 1:
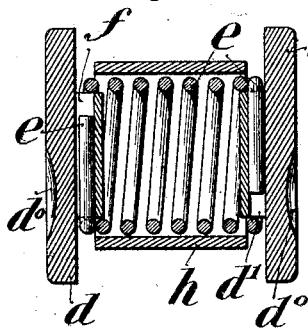
Figure 1:
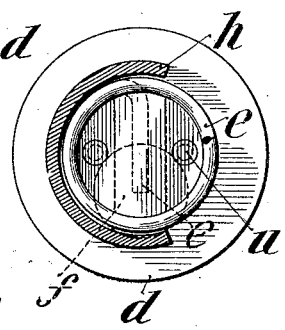
Figure 1:
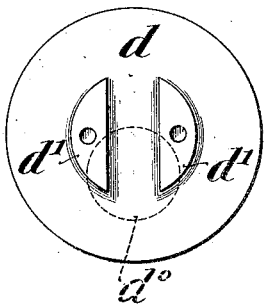
Figure 1:
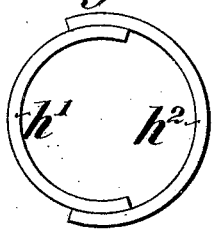
Figure 1:
Figure 1:

Figure 1 shows a portion of a bearing, the intermediate pieces of which are constructed in accordance with this invention. Fig. 2 is an enlarged longitudinal section of an intermediate piece. Fig. 3 is a transverse section of such intermediate piece. Fig. 4 shows a transverse section of one of the end plates with the bridge belonging to it. Fig. 5 is a plan of the bridge of an end plate constructed in a different manner and with the plate of the bridge removed. Fig. 6 is a transverse section of such end plate with the plate of the bridge in position. Fig. 7 shows a different form of constructing the casing.

In the form of carrying out the invention which is illustrated in the example shown in Fig. 1 the ball-bearing consists of an inner ring $b$, an outer ring $a$, the balls $c$, and the intermediate pieces, to the special construction of which the invention relates. Neither the particular kind of ball-bearing employed nor the construction and arrangement of the grooves and rings separately considered form any part of the invention. With reference to the general construction of the intermediate pieces it is necessary to say that they are formed by spiral or coiled springs $e$, to the ends of which the end plates $d$ are attached. The connection between these end plates and the springs is effected by means of a cylindrical projection formed at the inner side of each end plate in which engages the end of the spring, the last coil of which is wound around the projection.

When the speed of rotation of the circumference of the crank-pin or of similar parts of machinery reaches a certain velocity, the friction between the balls and the end plates at the point of contact becomes sufficiently great to cause abrasion of the end plate as the result of the sliding motion of the ball upon the end plate, due to the motion of the bearing. It is consequently the first object of the invention to enlarge the surface where ball and end plate come in contact. In the example of carrying out the invention illustrated in the drawings the enlargement of the bearing-surface has been brought about by providing in each of the end plates $d$ a recess or cavity $d^0$ equal to a segment of the ball, the centers of such recesses or cavities corresponding with the position of the point of contact between ball and end plate, being arranged eccentrically to the center of the end plate; but as it is very difficult when assembling the intermediate pieces so to connect the ends of the springs with the plates that the ends of the springs placed in the spaces or openings provided for this purpose and the center of the cavities $d^0$ shall be accurately in the same vertical plane and as, moreover, in consequence of the pressing together of the springs effected by the action of the bearing small distortions of the two end plates, and consequently injurious twisting of the springs cannot easily be avoided, the device has been adopted of so attaching one or both ends of the springs to the plates that they are able without affecting thereby the other parts of the contrivance to turn to a certain extent with relation to the plate or plates. To enable this to be done, the opening or the space $f$ in the projection $d'$, through or in which the end of the spring is placed, is either in the case of one plate alone or in the case of both plates made so broad that the end of the spring has sufficient play within it to be able to turn to the extent required.

In the example of carrying out the invention illustrated in Figs. 3 and 4 the projection with the widened opening for the end of the spring is formed by riveting to the end plate $d$, by means of rivets $u$, suitably-formed pieces $t'$, which carry a second plate $t$, the so-called "bridge-plate," whereby sufficient space is left between the pieces $t'$ to give the necessary play to enable the end of the spring placed in the opening to turn.

In the form of carrying out the invention illustrated in Figs. 5 and 6 the cylindrical projection $d'$ and the plate $d$ are made in one piece, and the place into which the end of the spring is put is formed by a recess, which is covered by the bridge-plate $t$, which is riveted, by means of rivets $u$, to the plate $d$. In this case also the width of the recess is considerably greater than that of the end of the spring. Consequently in this case also the object of giving sufficient play to the bent end of the spring to enable it to turn is achieved.

To avoid too great a pressing together of the intermediate pieces or of the springs $o$, due to the pressure exercised as a consequence of the acceleration of speed referred to in the beginning of this description, in accordance with the present invention a C-shaped oscillating casing $h$ is pushed over the spring between the two end plates, which even when special reasons may make it appear desirable to surround the spiral spring completely with this C-shaped casing can be made in two pieces $h'$ $h^2$, Fig. 7, the ends of which overlap, with the result that the whole surface of the two end plates of the intermediate pieces when pressed together is thereby supported.

What we claim as our invention, and desire to secure by Letters Patent, is—

1. In a ball-bearing, an intermediate piece having a plate formed with a recess shaped to receive a portion of the ball.

2. In a ball-bearing, an intermediate piece having end plates and an interposed spring, and a C-shaped casing disconnected from the spring and extending over the spring and expansible to permit its withdrawal sidewise from this spring.

3. In a ball-bearing, an intermediate piece having end plates separated by a spring, one of said plates having a recess to receive a part of the ball and the recess adapted to receive an end of the spring and to permit a limited movement of such end therein.

In witness whereof we have hereunto signed our names in the presence of two subscribing witnesses.

AUGUST RIEBE.
PAUL BRÜHL.

Witnesses:
HENRY HASPER,
WOLDEMAR HAUPT.